United States Patent [19]

Miller

[11] Patent Number: 5,413,193
[45] Date of Patent: May 9, 1995

[54] ADJUSTABLE EYE BOLT FOR BICYCLE CANTILEVER BRAKES

[76] Inventor: Steven Miller, 2209 Gorman St., Camarillo, Calif. 93010

[21] Appl. No.: 221,697

[22] Filed: Mar. 31, 1994

[51] Int. Cl.6 .............................................. B62L 1/08
[52] U.S. Cl. ................................................ 188/24.19
[58] Field of Search ............... 188/24.11, 24.12, 24.19, 188/24.22, 24.21, 24.18

[56] References Cited

U.S. PATENT DOCUMENTS

| | | | |
|---|---|---|---|
| 4,765,443 | 8/1988 | Cunningham | 188/24.21 |
| 5,293,964 | 3/1994 | Li | 188/24.19 |
| 5,320,199 | 6/1994 | Min | 188/24.19 |

FOREIGN PATENT DOCUMENTS

| | | | |
|---|---|---|---|
| 0432719 | 12/1911 | France | 188/24.21 |
| 0848770 | 11/1939 | France | 188/24.19 |
| 944908 | 11/1948 | France | |
| 598750 | 3/1948 | United Kingdom | |

Primary Examiner—Robert J. Oberleitner
Assistant Examiner—Peter M. Poon
Attorney, Agent, or Firm—Gene W. Arant; Timothy E. Siegel

[57] ABSTRACT

An eye bolt for a bicycle cantilever brake system is modified by the enlargement of the shoulders of the head, so that they no longer set within the contoured adjustment washer and the addition of a device to hold the brake shoe stud within the eye. Generally this device would include a threaded hole oriented transversely to the eye and a cooperative set screw. This combination allows the brake shoe stud to be held firmly in place in the eye shaft. With this configuration, the brake shoe may be replaced or adjusted without undoing the nut which retains the eye bolt, thereby allowing the firm retention of the contour adjustment washers during the operation.

3 Claims, 2 Drawing Sheets

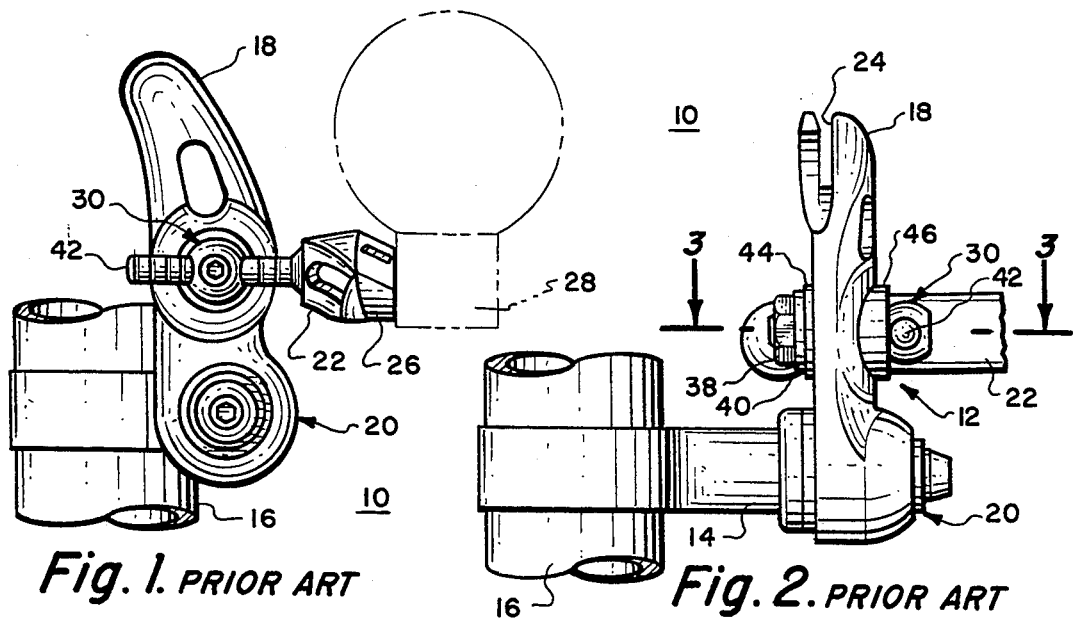
Fig. 1. PRIOR ART
Fig. 2. PRIOR ART
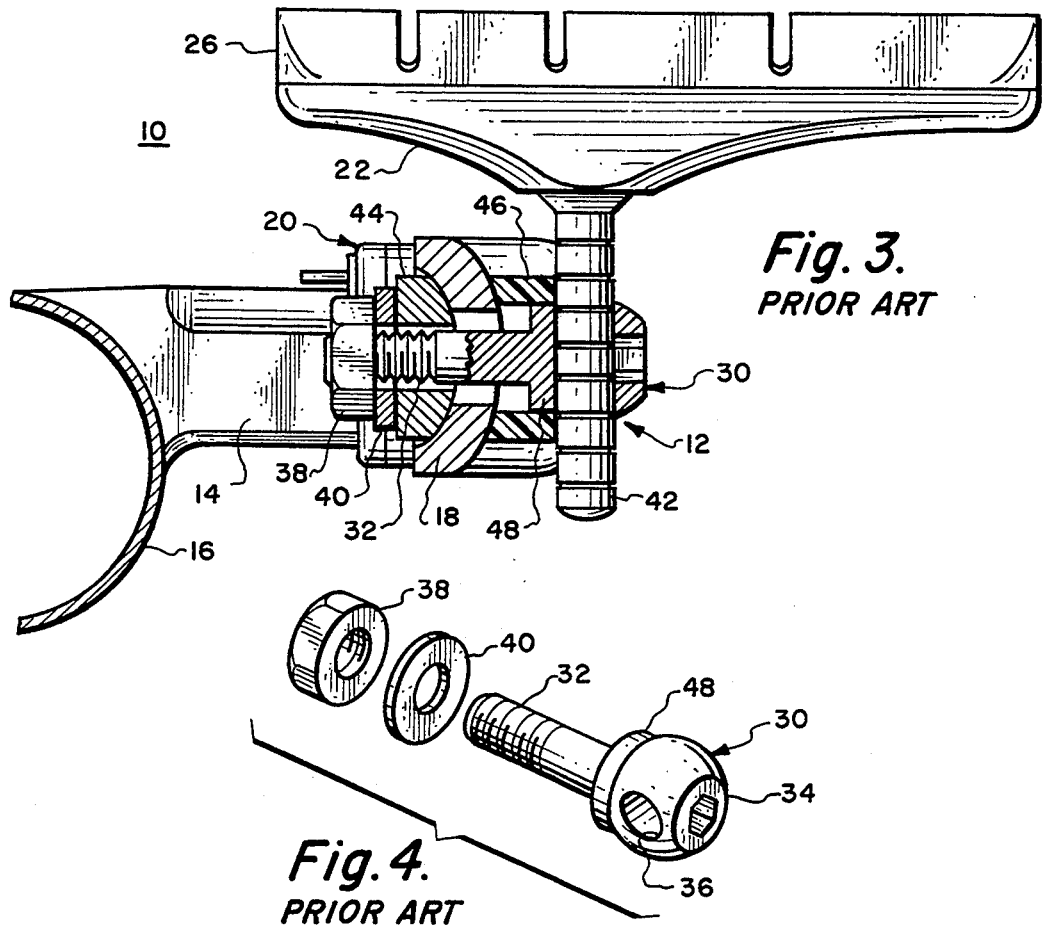
Fig. 3. PRIOR ART
Fig. 4. PRIOR ART

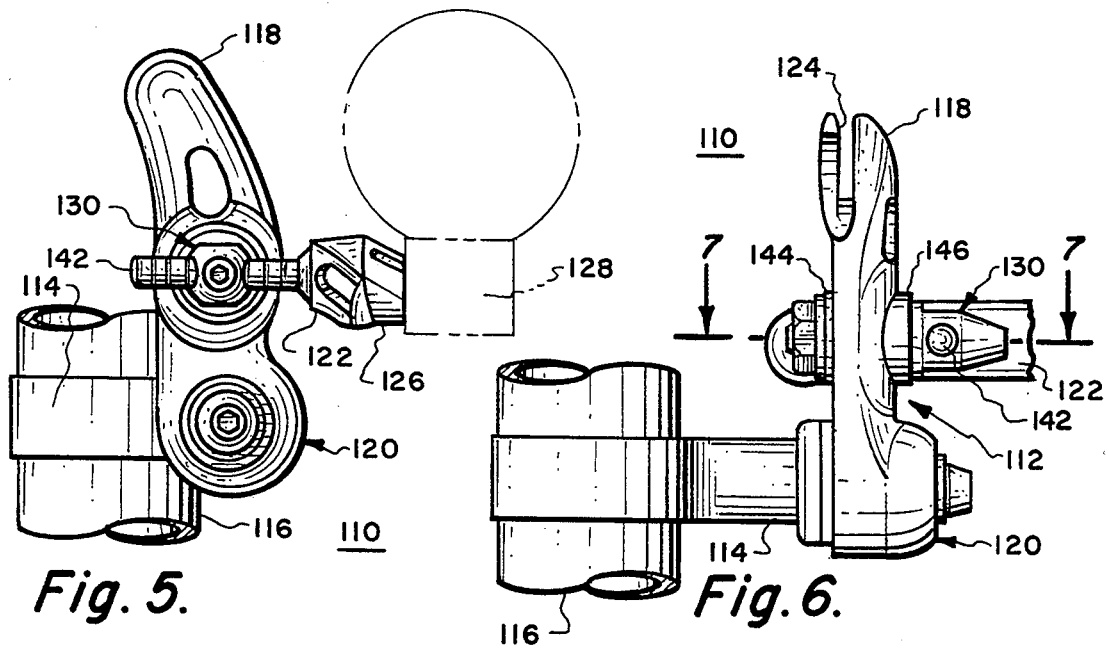
Fig. 5.
Fig. 6.
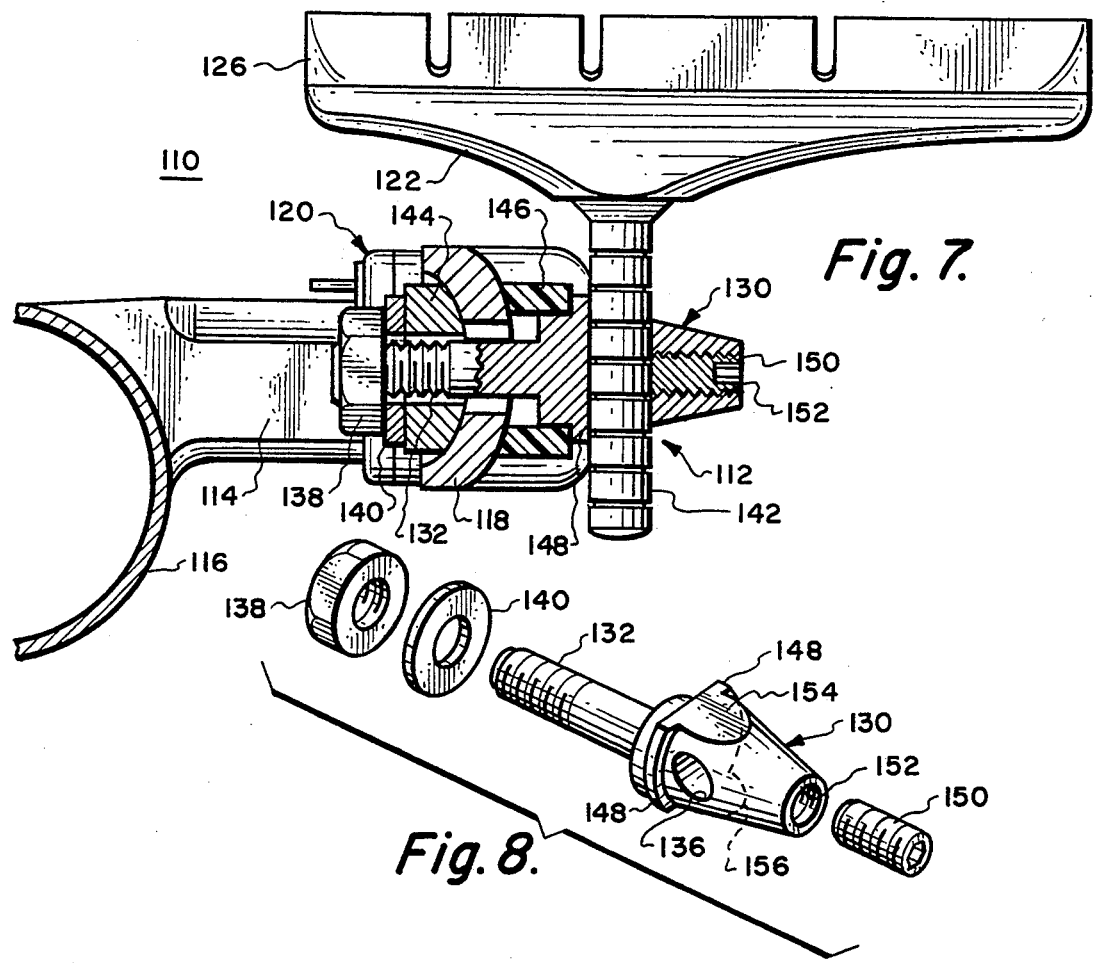
Fig. 7.
Fig. 8.

ADJUSTABLE EYE BOLT FOR BICYCLE CANTILEVER BRAKES

BACKGROUND OF THE INVENTION

The adjustment of bicycle hand brakes has generally been a tricky problem for the bicycle rider. If the brake shoes are set at too great a distance from the wheel rim, they will not make sufficient contact when the brake lever is depressed. If they are too close they will make contact when the brake lever is not depressed, slowing the cyclist down considerably. Furthermore, to work optimally the brake shoes should be at the correct orientation with respect to the outward tilt of the rim. In addition, the brake shoe should be oriented and positioned so that it runs cleanly along the length of rim it contacts, rather than hitting the tire or extending uselessly beyond the interior of the rim. In addition, it is generally most effective for the brake shoe to be oriented so that the forward most part of the shoe is closest to the rim.

Many modern day bicycles are fitted with cantilevered brakes. This type of system includes a cantilevered piece on each side of the wheel rim. This piece is connected near the top with a wire, which is pulled inward and upward when the rider wishes to stop. An eye bolt is generally coupled to the middle of the cantilevered piece. An eye bolt shares with other bolts the characteristics of having a threaded end and an opposed end which expands to form a head. An eye bolt, however, also includes a cylindrical hole or an "eye" running transversely through the head. In a cantilever brake system, the brake shoe stud (a pole connected transversely to the back of the brake shoe pad) fits through the eye of the eye bolt.

With this type of system, brake adjustments may be effected by adjusting a set of contoured washers on the eye bolt which holds the "brake shoe stud." When these washers are all correctly adjusted and the brake shoe is positioned at the correct distance from the wheel rim, the nut holding the eye bolt in place must be carefully tightened in order for all of the adjustments are retained. When this is done, a predetermined contoured washer presses against the brake shoe stud, holding it in place.

When a new brake shoe must be installed, however, it is necessary to undo the nut retaining the eye bolt. Unfortunately, when this nut is unscrewed from the eye bolt, none of the contoured washers are rigidly kept in place. As a result, when the new brake shoe has been installed it may be necessary to readjust these washers, significantly complicating the entire process.

Moreover, even if a bicyclist desires merely to change the distance from brake shoe to wheel rim, it is necessary to undo the retaining nut, which could again lead to the necessity of more adjustments. This is also necessary if the only desired adjustment is the orientation of the brake pad relative to the curvature of the rim.

What is needed but has been up until now unavailable, is a system which allows the brake shoe to be changed or adjusted without loosening the nut which retains the eye bolt in place.

SUMMARY OF THE INVENTION

The current invention involves an improvement to a cantilever brake system which includes a cantilever piece, an eye bolt transversely through the cantilever piece, a brake shoe with its stud retained in the eye of the eye bolt and at least one contoured washer interposed between the cantilever piece and the head of the eye bolt. The improvement consists of the combination of 1) an eye bolt with a head that is sufficiently wide so that it does not set within but rather on the rim of the contoured washer 2) releasable means for rigidly retaining the brake shoe stud in the eye.

A preferred means for retaining the brake shoe stud is a threaded hole extended from the exterior of the eye bolt head to the eye, oriented transversely to the eye. When a cooperatively threaded screw or bolt is tightened in this hole, the brake shoe stud is rigidly retained. The brake shoe stud may be replaced by loosening this screw, without loosening the nut which retains the eye bolt and the contoured adjustment washers. As a result the replacement operation may be undertaken without necessitating readjustments to these washers.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 1 is a front view of a cantilever braking system of the prior art;

FIG. 2 is a side view of the cantilever braking system of FIG. 1;

FIG. 3 is a downward looking cross-section view of the cantilever braking system of FIG. 2, along plane 3—3;

FIG. 4 is a perspective view of the eye bolt, washer and nut used in cantilever braking system of FIGS. 1, 2 and 3;

FIG. 5 is a front view of a cantilever braking system incorporating the present invention;

FIG. 6 is a side view of the cantilever braking system of FIG. 5;

FIG. 7 is a downward looking cross-section view of the cantilever braking system of FIG. 6, along plane 3—3;

FIG. 8 is a perspective view of the eye bolt, washer and nut used in cantilever braking system of FIGS. 5, 6 and 7.

DETAILED DESCRIPTION OF A PRIOR ART CANTILEVER BRAKE SYSTEM

FIGS. 1, 2, and 3 show a typical prior art bicycle cantilever brake system. In the typical prior art system 10, the brake mechanism 12 is retained by a mount 14 to one of the downward directed wheel retaining bars 16 of the bicycle. A cantilever piece 18 is attached to this clamp 14 by means of a hinge 20. A symmetric mechanism is attached to the matching wheel retainer bar (not shown). As may be seen in FIG. 1 the brake shoe 22 is held transversely to the cantilever piece 18 so that when the cantilever piece is pulled inwardly from a wire threaded through groove 24, the brake pad 26 moves into contact with the rim 28 of the bicycle wheel (not shown).

In greater detail, an eye bolt 30 is fit transversely through the cantilever piece 18. As FIG. 4 shows, this eye bolt 30 comprises a threaded end 32 and a headed end 34 with an "eye" or cylindrical hole 36 extending through the head from side to side. The eye bolt 30 is fastened onto the cantilever piece with a retaining nut 38 and plain washer 40. The brake shoe 22 consists of a brake pad 26 and a brake shoe stud 42. This stud fits through the eye 36 of the eye bolt 30.

First and second contoured adjustment washers 44 and 46 respectively permit adjustments in the orientation of the brake shoe 22. The shoulders 48 of the headed end of the eye bolt slip into contoured washer 46 allowing the brake shoe stud to be held in place by pressure from this washer 46 when the retaining nut 38 is tightened.

With this configuration changing the brake shoe can turn into quite a chore. The retaining nut 38 must be loosened which not only allows the brake shoe stud 42 to be removed from the eye 36 but also allows the first and second contoured adjustment washers 44, 46 to rotate out of adjustment. When the new brake shoe is installed, care must be taken so that the brake shoe and the contoured washers 44, 46 are placed in an adjusted position.

DETAILED DESCRIPTION OF THE PREFERRED EMBODIMENT

FIGS. 5, 6, 7 and 8 show the preferred embodiment of the present invention. As much of this system is the same as the system shown if FIGS. 1, 2, 3 and 4, like parts are labelled with the same number plus 100. Note that in the present invention the shoulders of the head of the eye bolt are expanded to provide a circumferential lip 148 that rests on the rim of contoured adjustment washer 146. Rather than contact pressure from contoured adjustment washer 146 retaining the brake shoe stud 142, the stud is retained by screw 150, when tightened into threaded shaft 152. First and second flat areas 154, 156 are placed on either side of the head of the eye bolt to allow the user to retain the eye bolt in position with a wrench while he is making adjustments.

This configuration has the advantage that the brake shoe 142 may be replaced without loosening retaining nut 138 and thereby releasing the contoured adjustment washers 146 and 158. This greatly simplifies the task of replacing the brake shoe. Moreover, an adjustment to clearance distance between the brake pad and the bicycle wheel or a rotation of the brake pad around the brake shoe stud may be effected without loosening retaining nut 138 and the attendant complications.

Any other method of releasably retaining the brake shoe stud also falls within the scope of this invention. For instance, the eye 136 could be split along one side and include a tightening/loosening mechanism so that it would be configured as a clamp about the brake shoe stud. Alternatively, the brake shoe stud could be threaded and retained by a nut on the side of the eye bolt opposite from the brake pad.

What I claim is:

1. In a cantilever brake system for a bicycle wheel that includes a brake mount terminating in a brake mounting screw, a brake arm having one end pivotally mounted on said brake mount and its other end adapted to receive a brake cable for causing the longitudinal center of the brake arm to move and thereby accomplish a braking action, a brake pad having a stud adapted for adjustably mounting the brake pad to the longitudinal center of the brake arm, and the brake arm having an opening at its longitudinal center for mounting the brake pad thereto, the subcombination for adjustably securing the brake pad stud to the brake arm, comprising:
    an elongated eye bolt having a threaded end adapted to be received in the opening of the brake arm, and to be secured therein with a nut;
    a contoured adjustment washer adapted to surround said elongated eye bolt and engage the brake arm when said bolt is received in the opening of the brake arm;
    said elongated eye bolt having on its other end a shoulder adapted to fit within said contoured adjustment washer, said shoulder also being enlarged to form a circumferential lip adapted to engage an end face of said contoured adjustment washer, so as to compress said adjustment washer against the brake arm;
    said enlarged end of said eye bolt further having, exterior to said shoulder, a transverse opening therein for receiving the brake shoe stud;
    said enlarged end of said eye bolt further having a threaded opening aligned generally perpendicular to said transverse opening; and
    a set screw engageable with said threaded opening for adjustably securing the brake shoe stud therein;
    whereby the brake shoe may be replaced or adjusted without undoing the nut which retains the eye bolt, thereby allowing the firm retention of said contour adjustment washer and the maintenance of its positional adjustment during the operation.

2. The subcombination of claim 1, wherein said shoulder of said eye bolt has two flat spots on opposite sides thereof, for ease of manipulation by a wrench.

3. Apparatus for adjustably securing a brake shoe stud to an opening in a brake arm of a cantilever brake system for a bicycle wheel, comprising:
    an elongated eye bolt having a threaded end adapted to be received in the brake arm opening;
    a nut for securing said threaded end in said opening;
    a contoured adjustment washer adapted to surround said eye bolt and engage the brake arm when said threaded end of said eye bolt is received in the opening of the brake arm;
    said elongated eye bolt having on its other end a shoulder adapted to fit within said contoured adjustment washer, said shoulder also being enlarged to form a circumferential lip adapted to engage an end face of said contoured adjustment washer so as to compress said adjustment washer against the brake arm;
    said lip of said shoulder also being cut away to form two flat spots on opposite sides of said shoulder, for ease of manipulation by a wrench;
    said enlarged end of said eye bolt further having, exterior to said shoulder, a transverse opening therein for receiving the brake shoe stud;
    said enlarged end of said eye bolt further having a threaded opening aligned generally perpendicular to said transverse opening; and
    a set screw engageable with said threaded opening for adjustably securing the brake shoe stud therein;
    whereby the brake shoe may be replaced or adjusted without undoing said nut that retains the eye bolt, thereby allowing the firm retention of said contour adjustment washer and the maintenance of its positional adjustment.

* * * * *